United States Patent
Cook et al.

(10) Patent No.: US 12,508,122 B1
(45) Date of Patent: Dec. 30, 2025

(54) METHOD OF FORMING A SUTURE-BUTTON-GRAFT COMBINATION AND FACILITATING CONSTRUCT

(71) Applicant: RIVERPOINT MEDICAL, LLC, Portland, OR (US)

(72) Inventors: Nathan Daniel Cook, Portland, OR (US); John Thomas Ferguson, Portland, OR (US); Edwin Anderson, Ridgefield, WA (US); Elliot Bixby, Gladstone, OR (US)

(73) Assignee: Riverpoint Medical, LLC, Portland, OR (US)

( * ) Notice: Subject to any disclaimer, the term of this patent is extended or adjusted under 35 U.S.C. 154(b) by 620 days.

(21) Appl. No.: 17/399,746

(22) Filed: Aug. 11, 2021

Related U.S. Application Data

(60) Provisional application No. 63/064,291, filed on Aug. 11, 2020.

(51) Int. Cl.
*A61F 2/08* (2006.01)
*A61B 17/04* (2006.01)
*A61B 17/06* (2006.01)

(52) U.S. Cl.
CPC ........ *A61F 2/0811* (2013.01); *A61B 17/0485* (2013.01); *A61B 17/06061* (2013.01); *A61B 2017/0404* (2013.01); *A61F 2002/0852* (2013.01); *A61F 2240/001* (2013.01)

(58) Field of Classification Search
CPC ............. A61F 2/0811; A61F 2240/001; A61B 17/0485; A61B 17/06061; A61B 2017/0404
See application file for complete search history.

(56) References Cited

U.S. PATENT DOCUMENTS

| | | | |
|---|---|---|---|
| 6,533,802 | B2 | 3/2003 | Bojarski |
| 7,658,751 | B2 | 2/2010 | Stone |
| 8,137,382 | B2 | 3/2012 | Denham |
| 8,672,968 | B2 | 3/2014 | Stone |
| 9,357,990 | B2 | 6/2016 | Ferguson |
| 9,486,211 | B2 | 11/2016 | Stone |
| 9,963,319 | B2 | 5/2018 | Ferguson |
| 10,194,900 | B2 | 2/2019 | Ferguson |
| 10,893,860 | B2 | 1/2021 | Ferguson |
| 2002/0052629 | A1 | 5/2002 | Morgan |
| 2008/0177302 | A1 | 7/2008 | Shurnas |
| 2010/0268273 | A1 | 10/2010 | Albertorio et al. |
| 2011/0087280 | A1* | 4/2011 | Albertorio ............ A61F 2/0811 606/232 |
| 2012/0046746 | A1 | 2/2012 | Konicek |

(Continued)

*Primary Examiner* — Bruce E Snow

(74) *Attorney, Agent, or Firm* — BrainSpark Associates, LLC

(57) ABSTRACT

A method of constructing a button, suture, and tendon graft combination, utilizing a tendon graft, a holder and a construct engaged to the holder. The construct has an oblong button defining at least a first aperture and a second aperture; a suture assembly, engaged to the button and defining a lumen; and a shuttle assembly, having a loop end in the form of a shuttle loop, and a free end, and passing through the lumen between the loop end and the free end. In the method, the suture assembly is engaged to the tendon graft and the shuttle is used to pull a portion of the suture assembly through the lumen. Finally, the construct is disengaged from the holder.

19 Claims, 12 Drawing Sheets

(56) References Cited

U.S. PATENT DOCUMENTS

| | | | |
|---|---|---|---|
| 2012/0123541 A1 | 5/2012 | Albertorio et al. | |
| 2015/0272721 A1* | 10/2015 | Marks | A61F 2/08 |
| | | | 606/232 |
| 2016/0008123 A1* | 1/2016 | Woodruff | A61F 2/08 |
| | | | 112/475.08 |
| 2021/0137515 A1 | 5/2021 | Ferguson | |

* cited by examiner

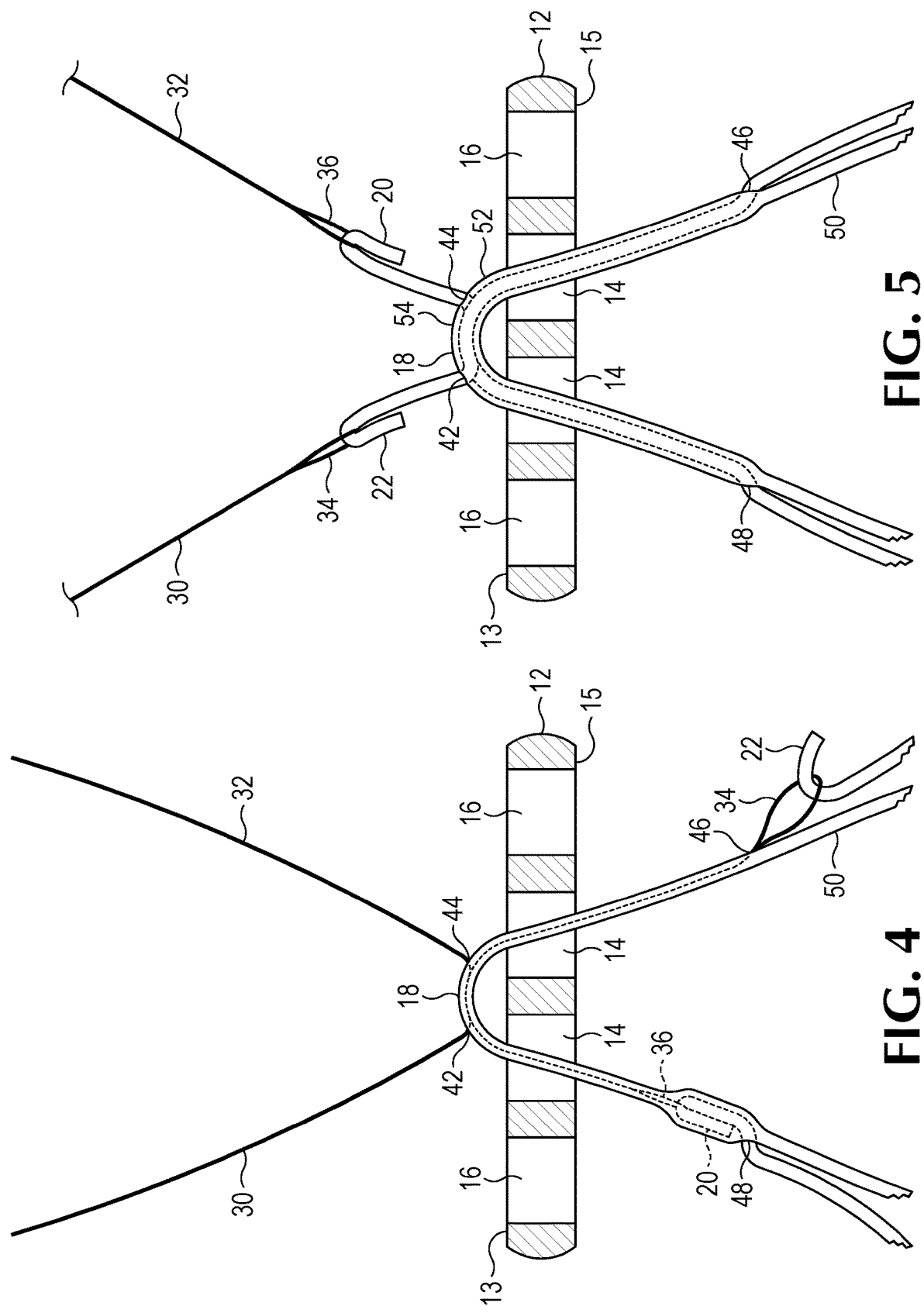

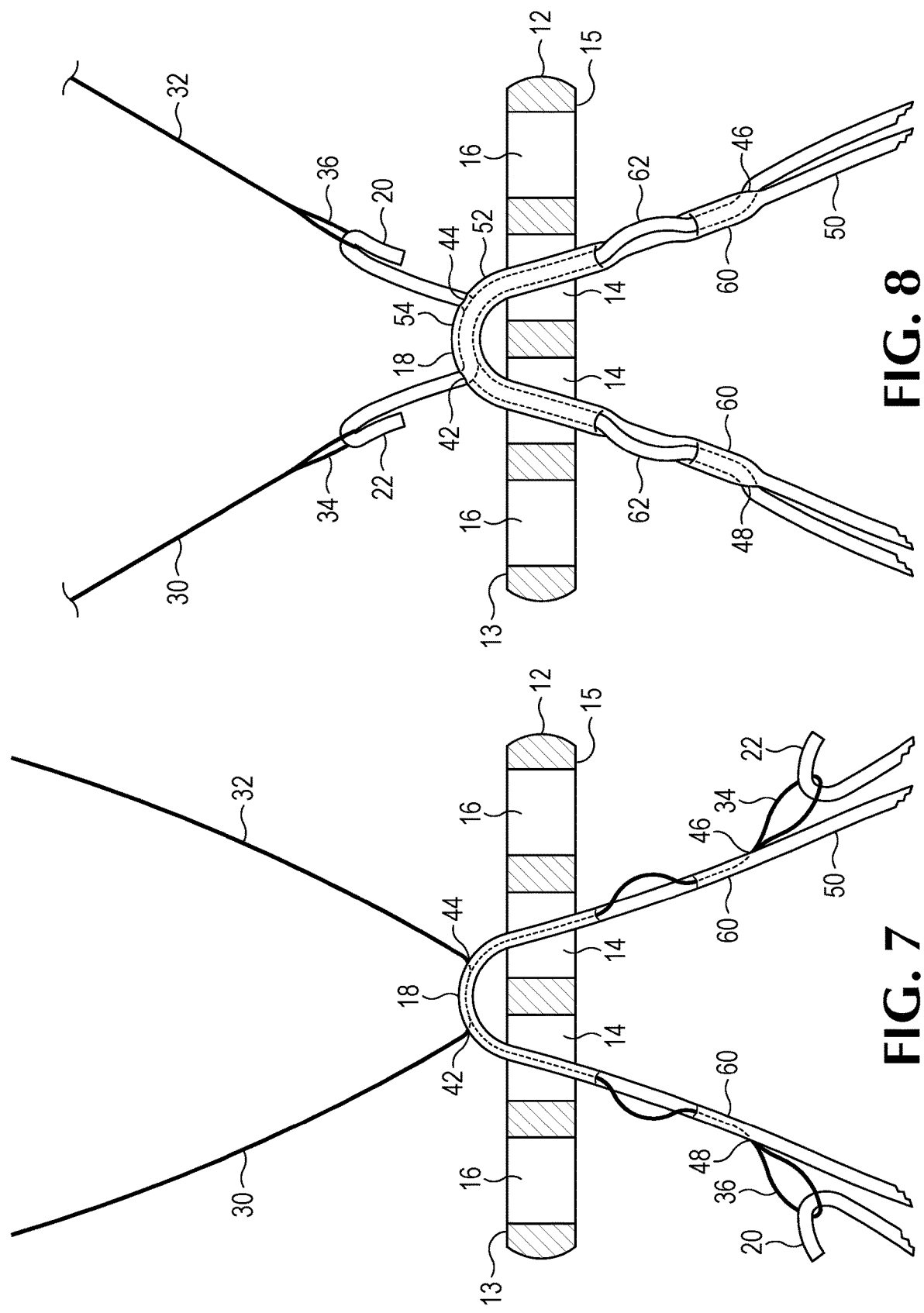

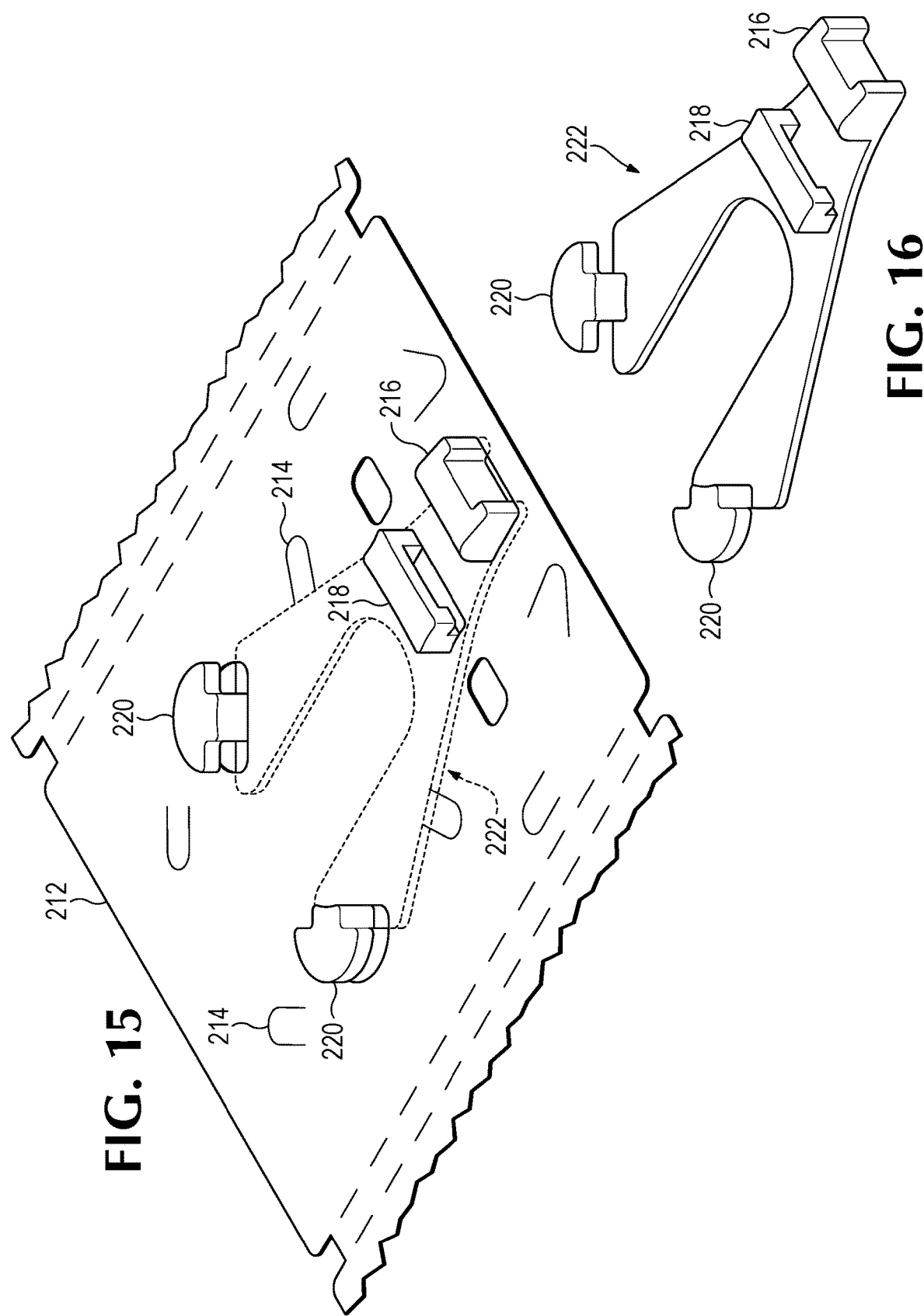

METHOD OF FORMING A SUTURE-BUTTON-GRAFT COMBINATION AND FACILITATING CONSTRUCT

RELATED APPLICATIONS

This application claims benefit of provisional patent application, U.S. Ser. No. 63/064,291, filed Aug. 11, 2020, which is incorporated by reference as if fully set forth herein.

BACKGROUND OF THE INVENTION

Perhaps the most frequently performed tendon replacement surgery is surgery to replace the anterior cruciform ligament ("ACL") in the knee of a patient. In this method a tunnel is drilled through the tibia and femur and a tendon graft attached on either end to a suture construct and is introduced into the tunnel and positioned so that it abuts the tunnel interior surface so that it will gradually root into the tibia and femur. The suture construct on either side is attached to the cortical bone about the tunnel opening. In one method, the graft is attached on one or both ends to a suture construct that consists of a suture loop that is engaged to an oblong button. To introduce the graft into the tunnel, the button is passed through the tunnel, from the tibial to the femoral opening, and reoriented so that it rests on the cortical bone surface of the femur. There are advantages to performing the surgery in this manner, as a button resting on cortical bone is less disruptive to the patient than an anchor screw, engaged into the bone. In the case where the graft is harvested from the patient's hamstring, the graft may be draped over the bottom of the loop. Because of this, the button/loop construct may be purchased as a unit, with the graft being draped over and then trussed shortly before surgery.

But in another technique, the graft is harvested from the patient's patella, which yields a graft that is comprised of bone on either end. Accordingly, this type of graft is generally referred to as a bone-tendon-bone ("BTB") graft. This type of graft is not long enough to be draped over the end of the loop in the same way as a hamstring graft. Consequently, until recently, a button/loop construct was not used with this type of graft, and other methods of fixation were used to attach the suture constructs, generally pierced through the ends of the graft to the ends of the tunnel. Recently, however, a method has been developed to construct the suture loop-button construct, attached to the graft, shortly before surgery. Another construct and method of constructing a suture-button-graft combination immediately before surgery would be beneficial to the medical community, by increasing available choices.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a method of constructing a button, suture, and tendon graft combination, utilizing a tendon graft, a holder and a construct engaged to the holder or card holder. The construct has an oblong button defining at least a first aperture and a second aperture; a suture assembly, engaged to the button and defining a lumen; and a shuttle assembly, having a loop end in the form of a shuttle loop, and a free end, and passing through the lumen between the loop end and the free end. In the method, the suture assembly is engaged to the tendon graft and the shuttle is used to pull a portion of the suture assembly through the lumen. Finally, the construct is disengaged from the holder.

In a second separate aspect, the present invention may take the form of an assembly for engaging a tendon graft to a button, which includes a holder or card holder; and a construct, engaged to the holder. The construct includes an oblong button defining at least a first aperture and a second aperture; a suture assembly, engaged to the button and defining a lumen; and a shuttle assembly, having a loop end in the form of a shuttle loop, and a free end, and passing through the lumen between the loop end and the free end.

In a third separate aspect, the present invention may take the form of a method of constructing a button, suture, and tendon graft combination, that utilizes a tendon graft, a holder or card holder and a construct, engaged to said holder. The construct includes a suture assembly, defining a lumen; and a shuttle assembly, having a loop end in the form of a shuttle loop, and a free end, and passing through said lumen between said loop end and said free end; engaging said suture assembly to said tendon graft; using said shuttle to pull a portion of said suture assembly through said lumen; and disengaging said construct from said holder.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced drawings. It is intended that the embodiments and figures disclosed herein are to be considered illustrative rather than restrictive.

FIG. 4 is a detail view of the button portion of the construct of FIG. 1, in a further stage of configuration, from FIG. 3.

FIG. 5 is a detail view of the button portion of the construct of FIG. 1, in a further stage of configuration, from FIG. 4.

FIG. 7 is a detail view of the button portion of an alternative embodiment to the construct of FIG. 1, but which is the same in the portions not shown in FIG. 7, and which is in the same stage of deployment as the FIG. 1 configuration is in FIG. 4, except for that the end section has not been pulled into the lumen, yet.

FIG. 8 is a detail view of the button portion of FIG. 7, at a further stage of deployment.

FIG. 15 is detail isometric view of a portion of the assemblage of FIG. 11, showing the position of a polymeric insert, relative to the holder.

FIG. 16 is an isometric view of the polymeric insert of FIG. 15.

DETAILED DESCRIPTION AND EMBODIMENTS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured. In the context of this application, a "shuttle" is a tension member with a loop at the end that can accept the tip of a suture and pull the suture through some opening or lumen.

Figure 1:
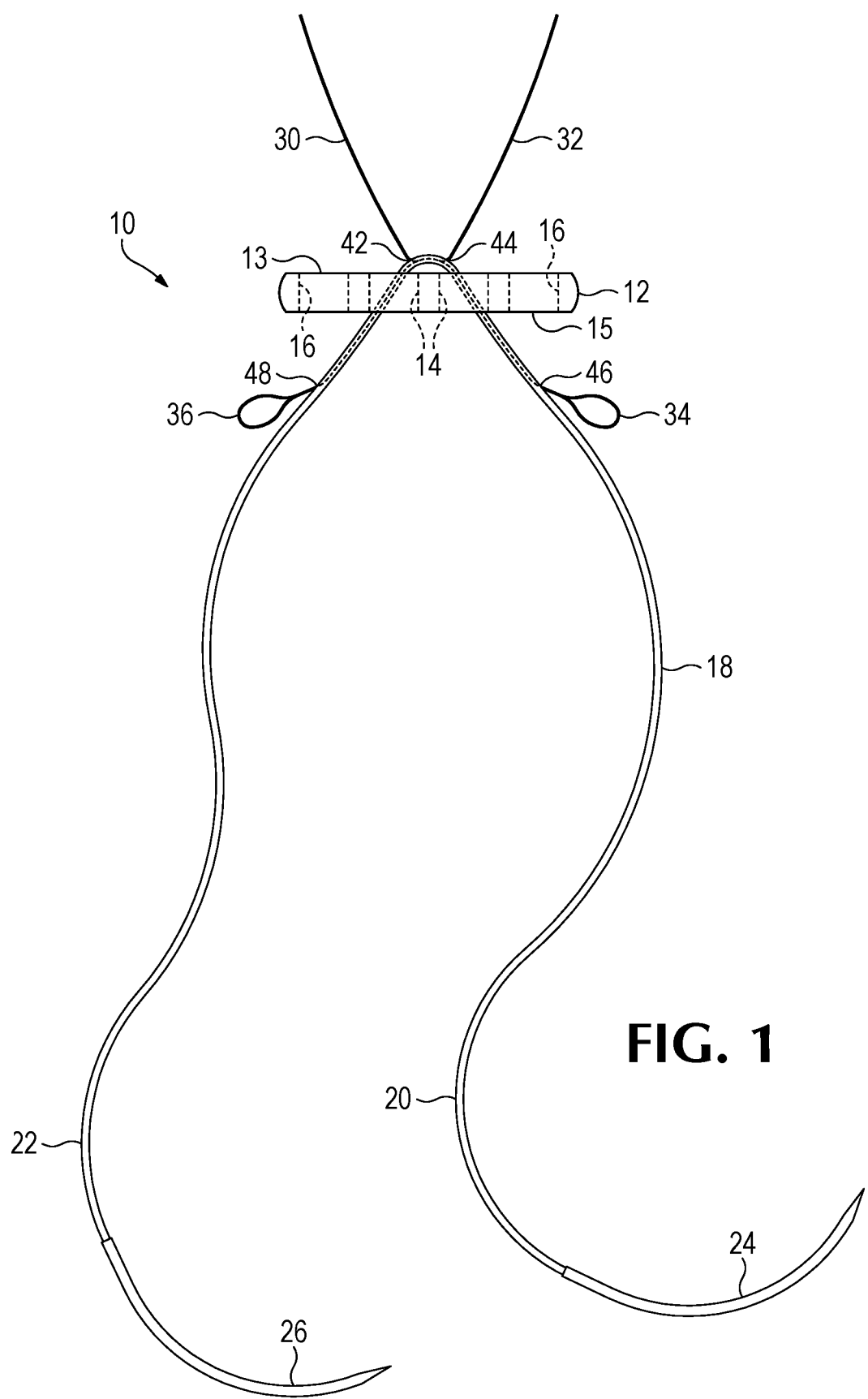
FIG. 1 is a front view of a suture/button construct, according to the present invention.

Referring to FIG. 1, a suture/button construct 10 includes an oblong button 12, having a first side (major surface) 13 and a second side 15 and, also having a pair of inner apertures 14 and a pair of outer apertures 16. A suture length 18 is engaged to said inner apertures 14, so that on a first side of button 12 suture length 18 extends between the two inner apertures 14, on a second side of button 12, suture length 18 has two ends 20 and 22, as shown, each terminating into a needle 24 and 26 respectively. Suture length 18 is a circular braid that defines an inner lumen. A first shuttle 30 and a second shuttle 32, each terminating in a terminal loop 34 and 36, respectively, enter at entrance points 42 and 44, respectively, extend through and exit, at exit point 46 and 48, respectively, from the inner lumen of suture length 18, crossing over each other in the process. Entrance points 42 and 44 are in a middle section of suture 18, which is on the first side of button 12 and are displaced from each other so that end sections 20 and 22 extend alongside each other inside the lumen. In a further embodiment, button 12 is not present.

Figure 2:
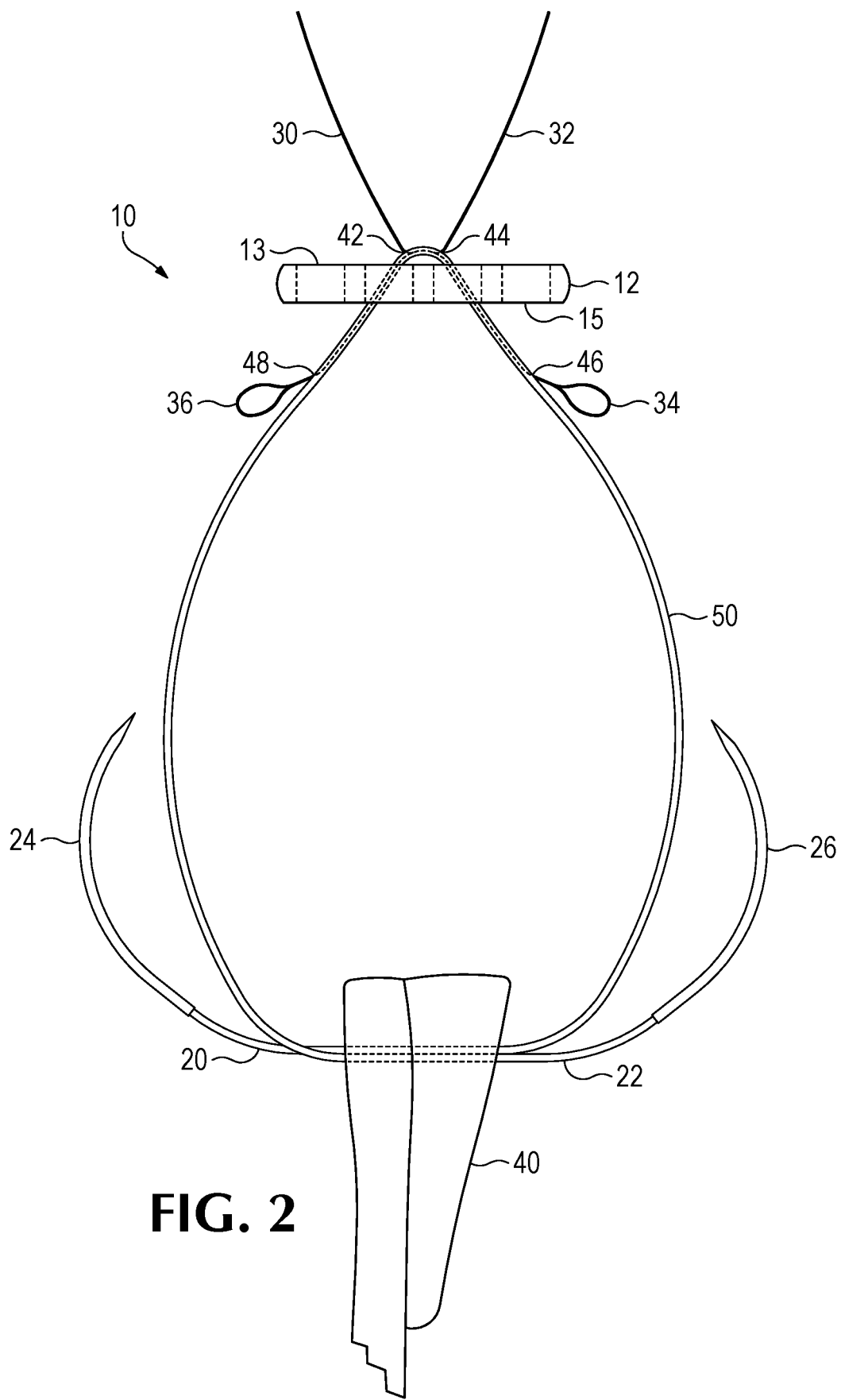
FIG. 2 is a front view of the suture/button construct of FIG. 1, engaged to a BTB graft.
Figure 3:
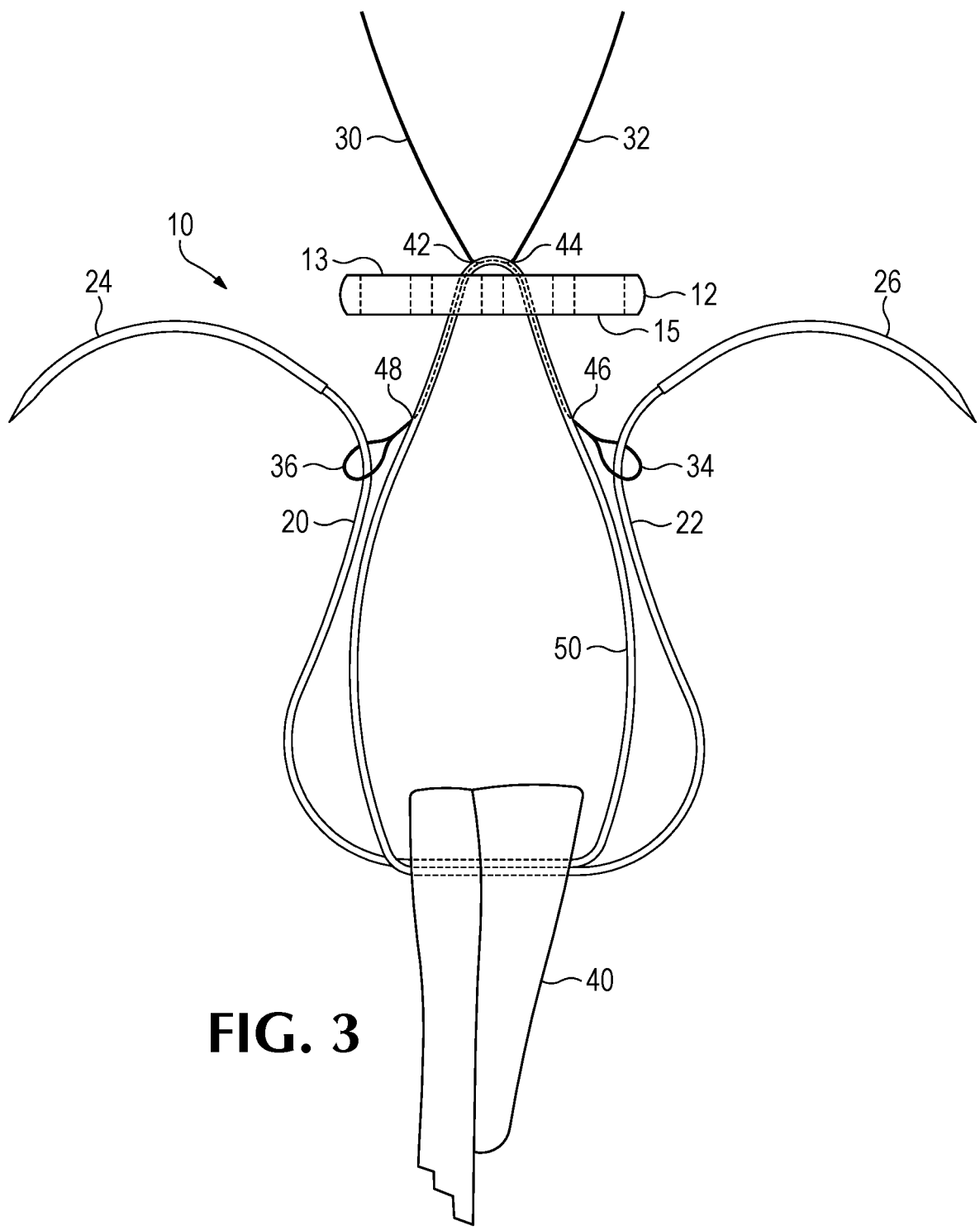
FIG. 3 is a front view of the suture/button construct of FIG. 1, engaged to a BTB graft, in a further stage of configuration from FIG. 2.
Figure 6:
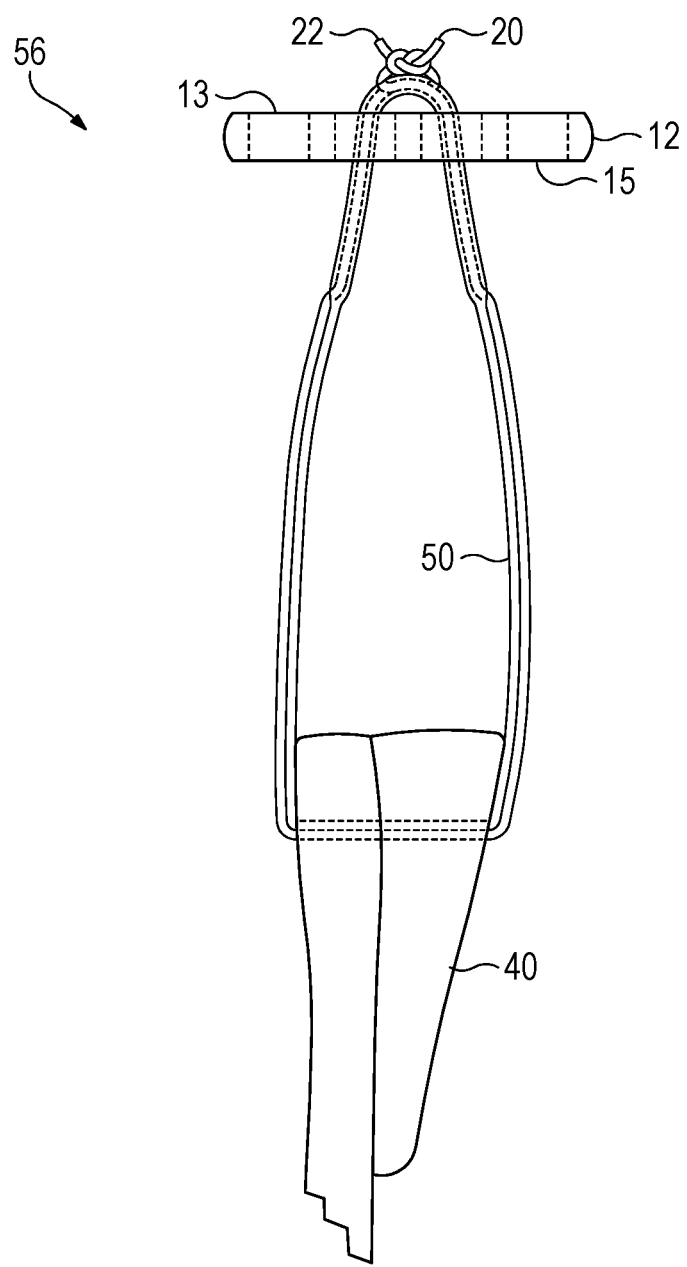
FIG. 6 is a front view of a completed button/suture/graft combination.

Referring now to FIG. 2, in a further step of constructing a button, suture loop and graft combination, a patella-harvested bone-tendon-bone graft 40 (only one end shown) has been pierced by needle 24 and needle 26, so that the two ends 22 and 24 extend through graft 40, thereby forming a loop 50. In the configuration shown in FIG. 3, needles 24 and 26 have been passed through terminal loops 36 and 34, respectively. In FIG. 4, needles 24 and 26 have been cut off the end sections 20 and 22, with end 20 shown as it has been pulled into the lumen of suture length 18. End 22 has been extended through loop 34 and is being pulled toward suture length 18. FIG. 5 shows the process when it is near the end result, with both ends 20 and 22 pulled through a portion of suture strand 18, to form a double trap 52 with a region of overlap 54. As shown in FIG. 6, this forms a construct 56 comprised of button 12, loop 50 and graft 40, with the graft suspended by the loop from the button. In the final stage shuttles 30 and 32 have been removed and ends 20 and 22 are tied together, to ensure that the loop 50 does not lengthen over time. Alternatively, ends 20 and 22 are cut and/or permitted to retract into the lumen of suture length 18, where they are trapped by the inward pressure of the braid of length 18.

Either before or after the steps shown in FIGS. 2-5, the other end (not shown) of graft 40 is attached to some form of suture connection. At this point button 12 may be passed through the tunnel in the tibia and femur by pulling on a thread engaged through an outer aperture 16. Button 12 is then reoriented to sit on the cortical bone surface of the femur, thereby permitting graft 40 to extend in the tunnel, in an optimal position to grow into the tunnel walls of the femur and tibia. The other end of graft 40 is connected by a suture to the tibia opening of the tunnel, either by an anchor that may screw into the tibia, or in some instances, by the use of a button loop construct just like the one shown (in a close to final form) in FIG. 5.

FIGS. 7 and 8 illustrate an alternative embodiment in which shuttles 30 and 32 pull suture end sections 22 and 20 respectively, first into and out of shoulder trap regions 60 of suture length 18 to form a pair of shoulder traps at regions 60. Then shuttles 30 and 32 pull end sections 22 and 20 into a double trap portion 52 of suture length 18 and past each other to forma region of overlap 54. Expansion of loop 50, after implantation is a potential problem to be avoided, and introducing additional traps 60, and having an area of overlap of end sections 20 and 22, within double trap 52, helps to prevent this problem. In embodiments, this length of overlap is greater than 0.5, 1, 2 and 3 cm.

Figure 10:
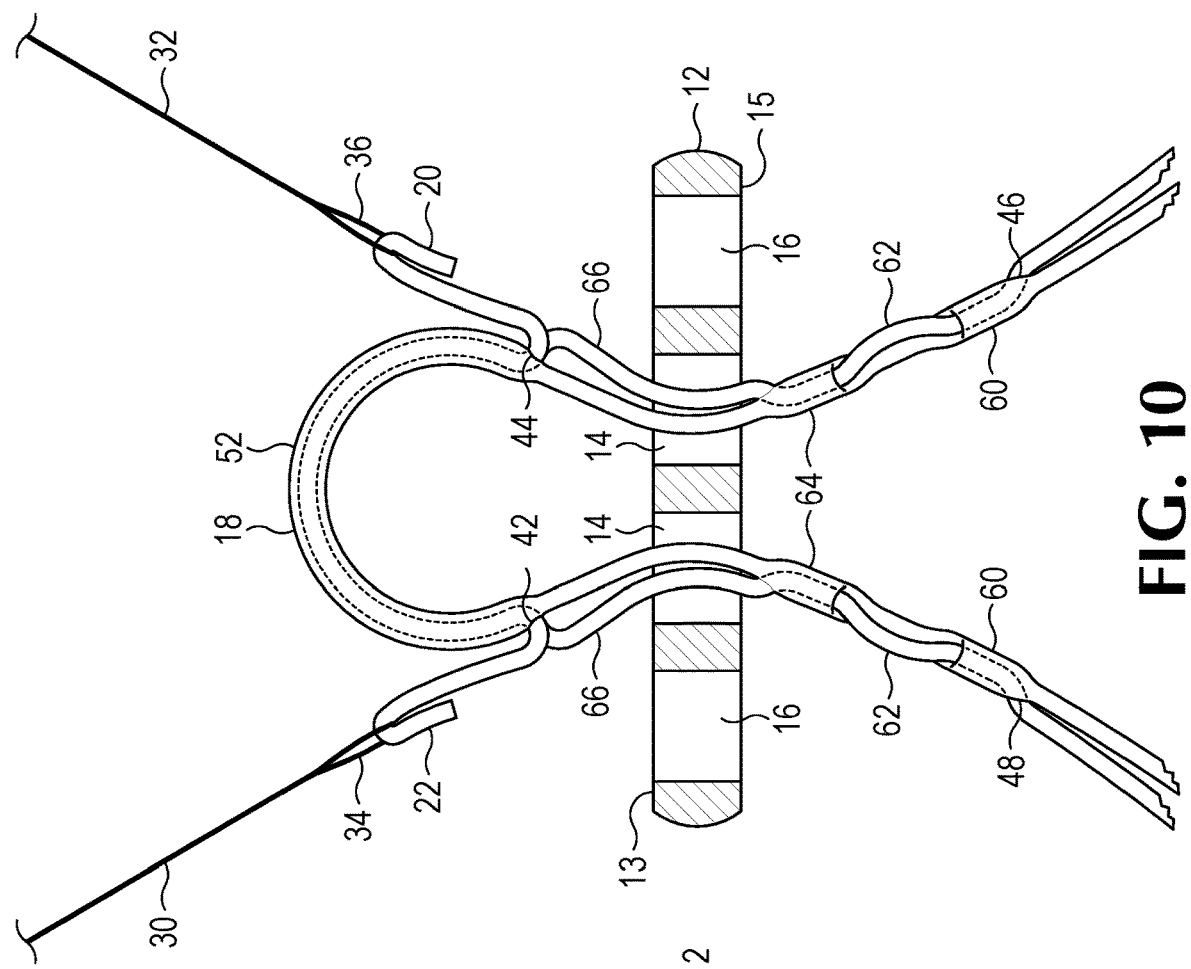
FIG. 10 is a detail view of the button portion of FIG. 9 at a further stage of deployment.
Figure 9:
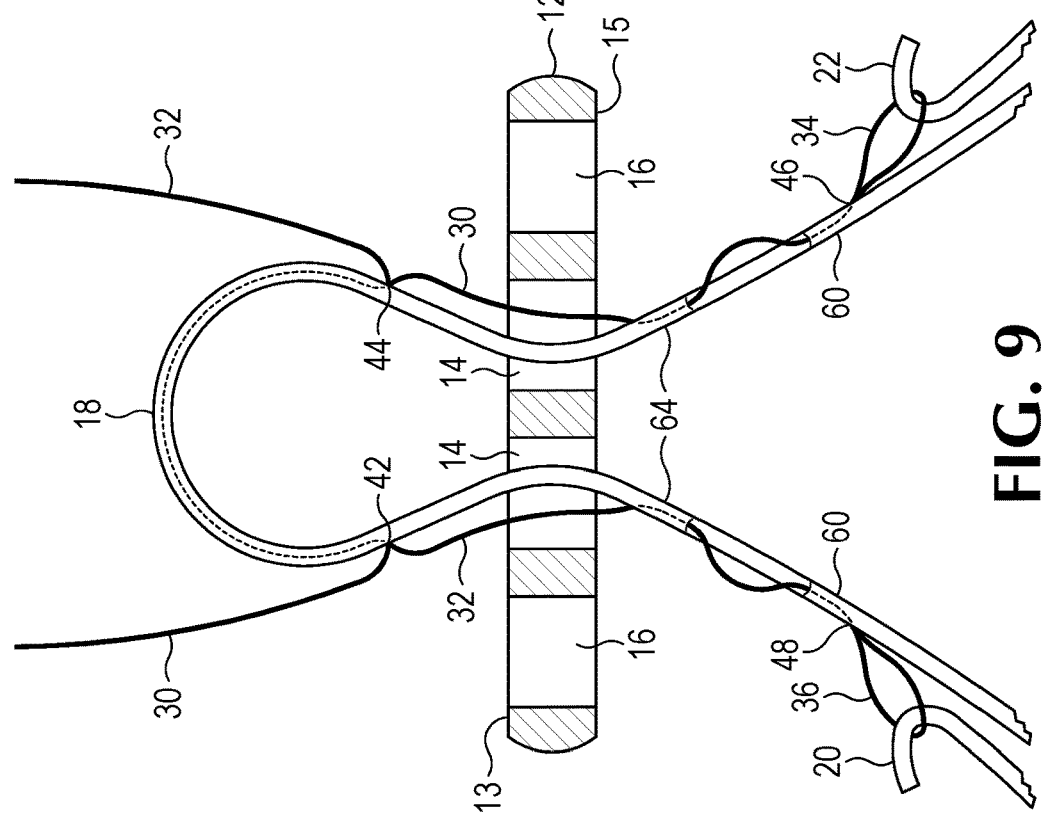
FIG. 9 is a detail view of the button portion of another alternative embodiment to the construct of FIG. 1, but which is the same in the portions not shown in FIG. 7, and which is in the same stage of deployment as the FIG. 1 configuration is in FIG. 4, except for that the end section has not been pulled into the lumen, yet.

FIGS. 9 and 10 illustrate another alternative embodiment in which shuttle 30 enters double trap portion 52 of suture length 18 at the same place where shuttle 32 leaves portion 52, and shuttle 32 enters double trap portion 52 of suture length 18 at the same place where shuttle 30 leaves portion 52, Also shuttles 30 and 32 pass through suture length 18 at shoulder trap regions 64 and 60. Accordingly, shuttles 30 and 32 pull suture end sections 22 and 20 respectively, first into and out of suture length 18 to form a first pair of shoulder traps at regions 60 and pass alongside suture 18 at free regions 62. Further members 30 and 32 pull end sections 22 and 20 into and out of suture length 18, to form another pair of shoulder traps at regions 64 and pass alongside length 18 at free regions 66, and then into and out of suture length 18, to form double trap 52, in which the two suture end sections 20 and 22 pass past each other for the entire length of trap 52, providing a greater retentive force to prevent the loop 50 from enlarging after implantation. In this embodiment both the entry and exit points of shuttles 30 and 32 are on the first side 13 of button so that they pass alongside suture length 18 as it passes through apertures 14, rather than inside the lumen of suture length 18 as in the previously discussed embodiments. In a further embodiment, trap regions 64 and free portions 62 are not present, so just traps 60 and trap 52 are in the final deployment. As may be well appreciated, this requires that both points 46 and 48 be located on the first side of button 12, with shuttles 30 and 32 passing through apertures 14 on the side of suture length 18. Expansion of loop 50, after implantation is a potential problem to be avoided, and introducing additional trap regions 64, and having an area of overlap of end sections 20 and 22, within double trap 52, helps to prevent this problem. In differing embodiments, this length of overlap is greater than 0.5, 1, 2, 3, 4 and 5 cm.

In one preferred embodiment shuttles 30 and 32 are made of metal and more particularly nitinol. In one preferred embodiment the interior of loops 34 and 36 is roughened, in a variant only at the bottom, to better engage and retain end sections 22 and 20, as they are folded over loops 34 and 36. In an embodiment an upward projection is created at the bottom of the interiors of loops 34 and 36 to positively engage with end sections 22 and 20. In a preferred embodiment suture length 18 is made either in whole or in part of ultra-high molecular weight polyethylene.

Figure 11:
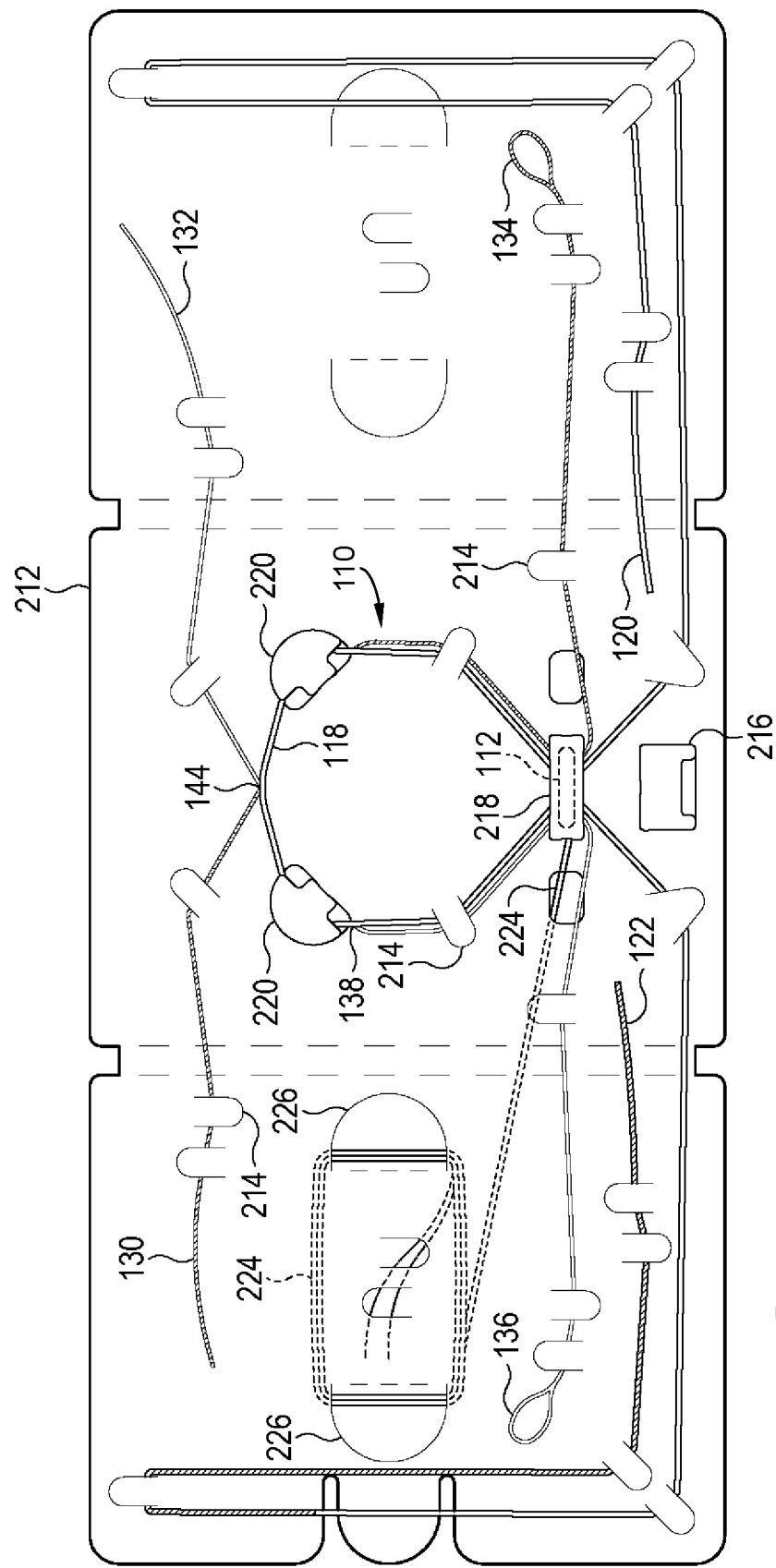
FIG. 11 is a plan view of an assemblage of a suture button construct that is similar to that of FIG. 1, supported on a holder, and having additional elements to facilitate use.

Referring now to FIG. 11, a bone-tendon-bone graft implant assembly 210 includes construct 110, similar to construct 10, which is supported on a holder or card holder 212 and includes a few additional items to facilitate use. Similar items, performing an identical function are designated with the reference number from FIG. 1 plus 100. In one significant difference, shuttles 130 and 132 do not cross over each other while inside suture length 118. The tails 120 and 122 of suture 118 are color coded (indicated by the hatching pattern of tail 122) to engage with the correct end loop 136 and 134 (having the same pattern is tail 122) respectively of shuttles 132 and 130, respectively. Construct 110 is held in place on a holder or card holder 212, which defines a number of cutout tabs 214. Also, holder or card holder 212 holds a graft seat 216, a button holder 218, inside of which there is a button 112. Also, two suture holders 220 are more prominent than tabs 214. As shown in FIG. 16, elements 216, 218 and 220 are all part of a plastic insert 222. A button puller suture 224 is wound around a pair of ears 226.

Figure 12:
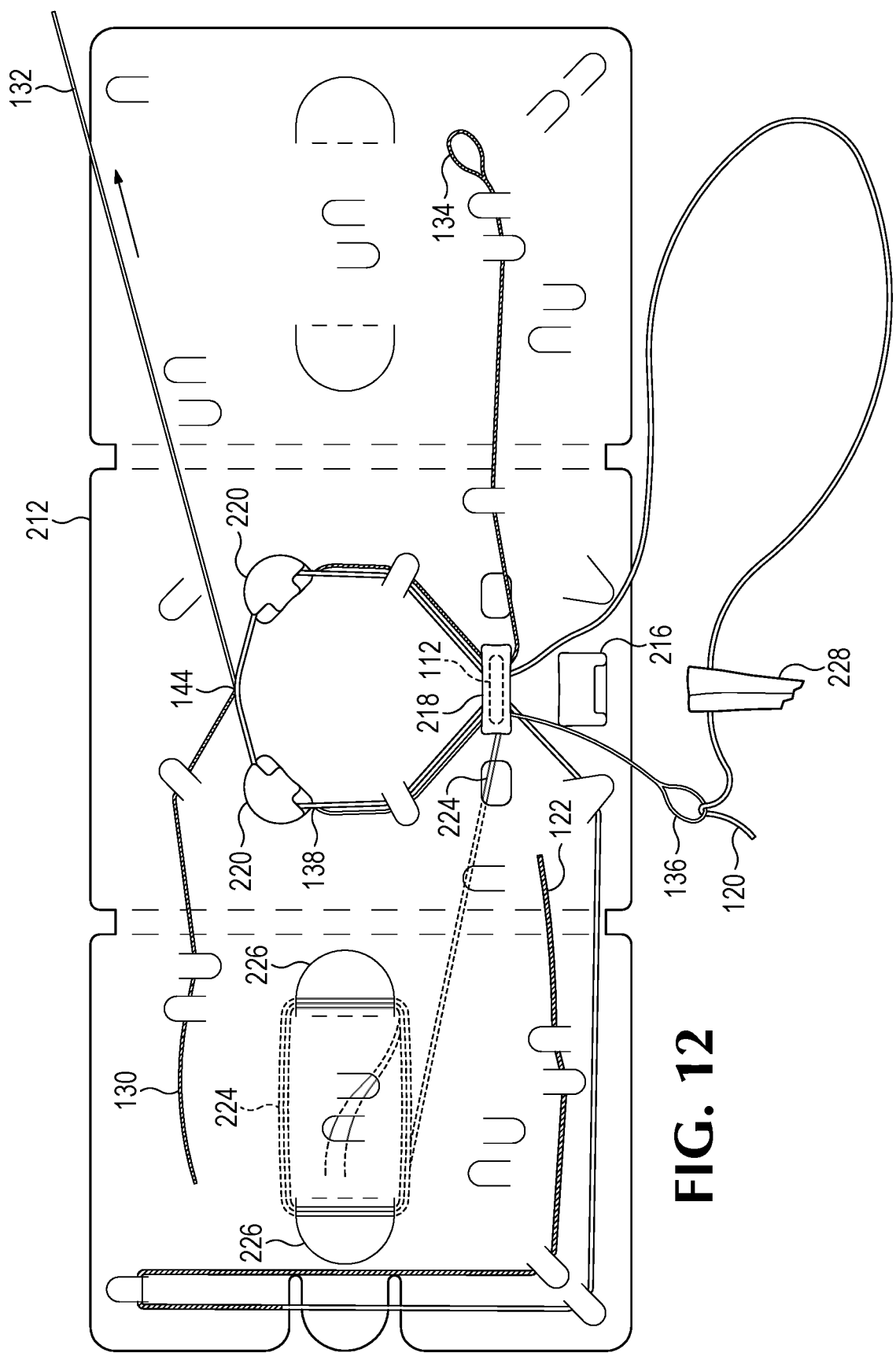
FIG. 12 is a plan view of the assemblage of FIG. 11, in a first illustrated stage of deployment.
Figure 13:
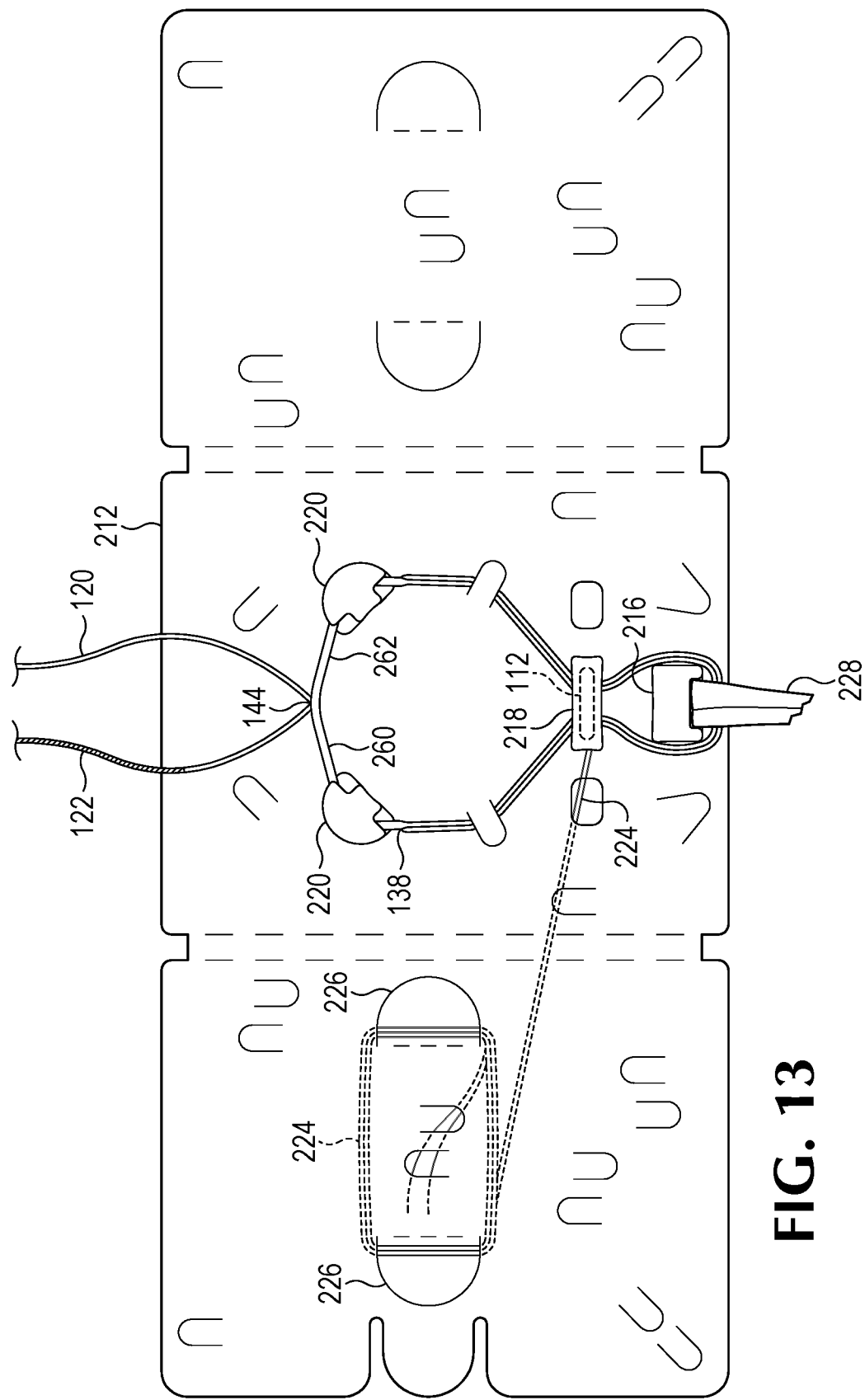
FIG. 13 is a plan view of the assemblage of FIG. 11, in a second illustrated stage of deployment.
Figure 14:
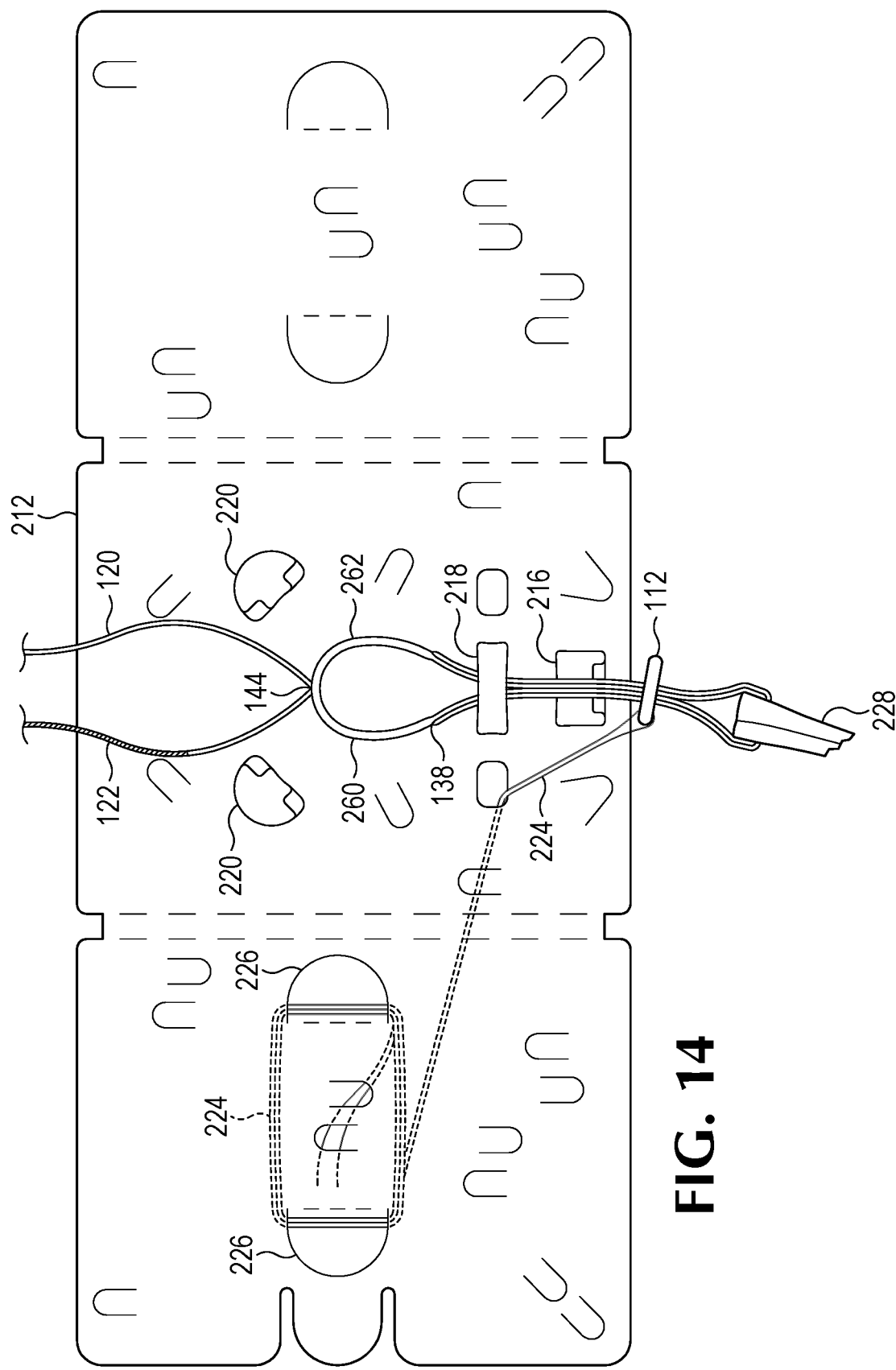
FIG. 14 is a plan view of the assemblage of FIG. 11, in a third illustrated stage of deployment.

Referring now to FIG. 12, suture end 120 is pushed through a graft 228 and engaged with loop 136. In one embodiment, no needles are provided as part of assembly 210, but the user threads end 120 onto a needle (not shown) to pierce through graft 228, and then removes the needle to arrive at the stage shown in FIG. 12. Shuttle 132 is pulled, to pull end 120 alongside a separate portion of suture 118, and then into suture 118 at entry point 138, and out again at exit point 144, to create a first trap 260. A parallel operation performed with shuttle 130, including end loop 134, and suture end 122, to create a second trap 262, shown in FIG. 13. As also shown in FIG. 13, in one method graft 228 is positioned on graft seat 216, to facilitate the above-described actions. As shown in FIG. 14, the construct 110 is now removed from 212 and plastic insert 222, by pulling button 112 free of button holder 218. Button puller 224 is unwound from ears 226 and may now be used to pull graft 228 through a tunnel that has been drilled in the tibia and femur, to a preferred position, as will be familiar to persons skilled in ACL tendon replacement surgery.

The disclosed embodiments are illustrative, not restrictive. While specific configurations of the construct and method have been described, it is understood that the present invention can be applied to a wide variety of suture-button-graft configurations. There are many alternative ways of implementing the invention.

What is claimed is:

1. A method of constructing a button, suture, and tendon graft combination, comprising:
   a) providing a tendon graft;
   b) providing a card holder;
   c) providing a construct engaged to said card holder, said construct comprising:
      i. a button defining at least a first aperture and a second aperture;
      ii. a suture assembly, said suture assembly engaged to said button, said suture assembly including a suture having a first tail and a second tail, at least a portion of said first tail of said suture engaged to said card holder at a first location and at least a portion of said second tail engaged to said card holder at a second location, said first location is different than said second location;
      iii. a shuttle assembly, said shuttle assembly comprising a first shuttle with a first shuttle loop and first shuttle tail, and a second shuttle with a second shuttle loop and a second shuttle tail;
   d) engaging said suture assembly to said tendon graft;
   e) extending a first and second tail of said suture assembly through a portion of said suture using said shuttle assembly; and
   f) disengaging said construct from said card holder.

2. The method of claim 1, wherein said card holder further includes a polymeric piece, said polymeric piece including elements about which said suture assembly is wound.

3. The method of claim 2, wherein said polymeric piece includes a button holder for said button.

4. The method of claim 2, wherein said polymeric piece includes a seat for said tendon graft, and wherein said tendon graft is placed into abutment against said seat, during a portion of said method.

5. An assembly for engaging a tendon graft to a button, comprising:
   a card holder; and
   a construct comprising:
      i. a button defining at least a first aperture and a second aperture;
      ii. a suture assembly, said suture assembly engaged to said button, said suture assembly including a suture having a first tail and a second tail; and
      iii. a shuttle assembly, said shuttle assembly comprising a first shuttle with a first shuttle loop and first shuttle tail, and a second shuttle with a second shuttle loop and a second shuttle tail;
   at least a portion of said first tail of said suture engaged with said card holder at a first location and at least a portion of said second tail of said suture engaged with said card holder at a second location, said first location is different than said second location.

6. The assembly of claim 5, wherein said card holder includes a polymeric piece-said polymeric piece comprises one or more elements about which at least a portion of said suture assembly is wound.

7. The assembly of claim 6, wherein said polymeric piece includes a button holder for said button.

8. The assembly of claim 6, wherein said polymeric piece includes a seat for said tendon graft.

9. A method of constructing a button, suture, and tendon graft combination, comprising:
   a) providing a tendon graft;
   b) providing a card holder;
   c) providing a construct, said construct engaged to said card holder, said construct comprising:
      i. a suture assembly, said suture assembly including a suture having a first tail and a second tail, at least a portion of said first tail of said suture engaged to said card holder at a first location and at least a portion of said second tail engaged to said card holder at a second location, said first location is different than said second location, said suture including at least one lumen;

ii. a shuttle assembly, said shuttle assembly including a shuttle loop and a free end;

d) engaging said suture assembly to said tendon graft;

e) using said shuttle assembly to pull a portion of said suture assembly through said at least one lumen of said suture; and f) disengaging said construct from said card holder.

10. The method of claim 9, wherein said card holder comprises a polymeric piece, said polymeric piece includes one or more elements about which said portion of suture assembly is wound.

11. The method of claim 10, wherein said one or more elements of said polymeric piece includes a graft seat for said tendon graft, and said tendon graft is placed into abutment against said graft seat, during a portion of said method.

12. The method of claim 1, wherein at least a portion of the first shuttle tail comprises a first shuttle pattern and at least a portion of said second shuttle tail comprises a second shuttle pattern, the first shuttle pattern is different than the second shuttle pattern.

13. The method of claim 12, wherein at least a portion of said first tail of said suture comprises a first tail pattern and at least a portion of said second tail comprises a second tail pattern, at least a portion of said first shuttle pattern matches at least a portion of said first tail pattern and at least portion of said second shuttle pattern matches at least a portion of said second tail pattern.

14. The method of claim 12, wherein at least a portion of said first tail of said suture comprises a first tail pattern and at least a portion of said second tail comprises a second tail pattern, at least a portion of said first shuttle pattern matches at least a portion of said second tail pattern and at least a portion of said second shuttle pattern matches at least a portion of said first tail pattern.

15. The method of claim 5, wherein at least a portion of the first shuttle tail comprises a first shuttle pattern and at least a portion of said second shuttle tail comprises a second shuttle pattern, the first shuttle pattern is different than the second shuttle pattern.

16. The method of claim 15, wherein at least a portion of said first tail of said suture comprises a first tail pattern and at least a portion of said second tail comprises a second tail pattern, at least a portion of said first shuttle pattern matches at least a portion of said first tail pattern and at least portion of said second shuttle pattern matches at least a portion of said second tail pattern.

17. The method of claim 15, wherein at least a portion of said first tail of said suture comprises a first tail pattern and at least a portion of said second tail comprises a second tail pattern, at least a portion of said first shuttle pattern matches at least a portion of said second tail pattern and at least a portion of said second shuttle pattern matches at least a portion of said first tail pattern.

18. The method of claim 9, wherein said card holder comprises a polymeric piece, said polymeric piece comprises a button holder and a graft seat, said polymeric piece being removably connected from said card holder.

19. The method of claim 18, said card holder comprising a plurality of insert openings, at least a portion of said button holder and a portion of said graft seat extending through said plurality of insert openings.

* * * * *